United States Patent [19]
Young, Jr. et al.

[11] 3,802,291
[45] Apr. 9, 1974

[54] SOFT STEERING WHEEL RIM
[75] Inventors: Frank E. Young, Jr., Grosse Ile, Mich.; Donald W. Bowser, Grabill, Ind.
[73] Assignee: Sheller-Globe Corporation, Toledo, Ohio
[22] Filed: Oct. 31, 1972
[21] Appl. No.: 302,560

[52] U.S. Cl. .................................... 74/552, 74/558
[51] Int. Cl. .............................................. B62d 1/04
[58] Field of Search .................... 74/552, 558, 558.5

[56] References Cited
UNITED STATES PATENTS
| | | | |
|---|---|---|---|
| 3,576,139 | 4/1971 | Conterno | 74/552 |
| 1,391,108 | 9/1921 | Hamblet | 74/558 |
| 2,155,488 | 4/1939 | Hendrie | 74/552 |
| 3,523,464 | 8/1970 | Quillery et al. | 74/552 |

Primary Examiner—Benjamin W. Wyche
Assistant Examiner—F. D. Shoemaker
Attorney, Agent, or Firm—Harness, Dickey & Pierce

[57] ABSTRACT

An automotive steering wheel rim which can be fabricated of various colors and is relatively soft to the touch, that is, with a durometer (Shore A) of between 40 and 55. The rim comprises relatively rigid core means, a layer of soft substrate material of 35 durometer or under and an outer covering secured to the substrate, the covering being of plastic material of approximately 70 durometer or more.

8 Claims, 13 Drawing Figures

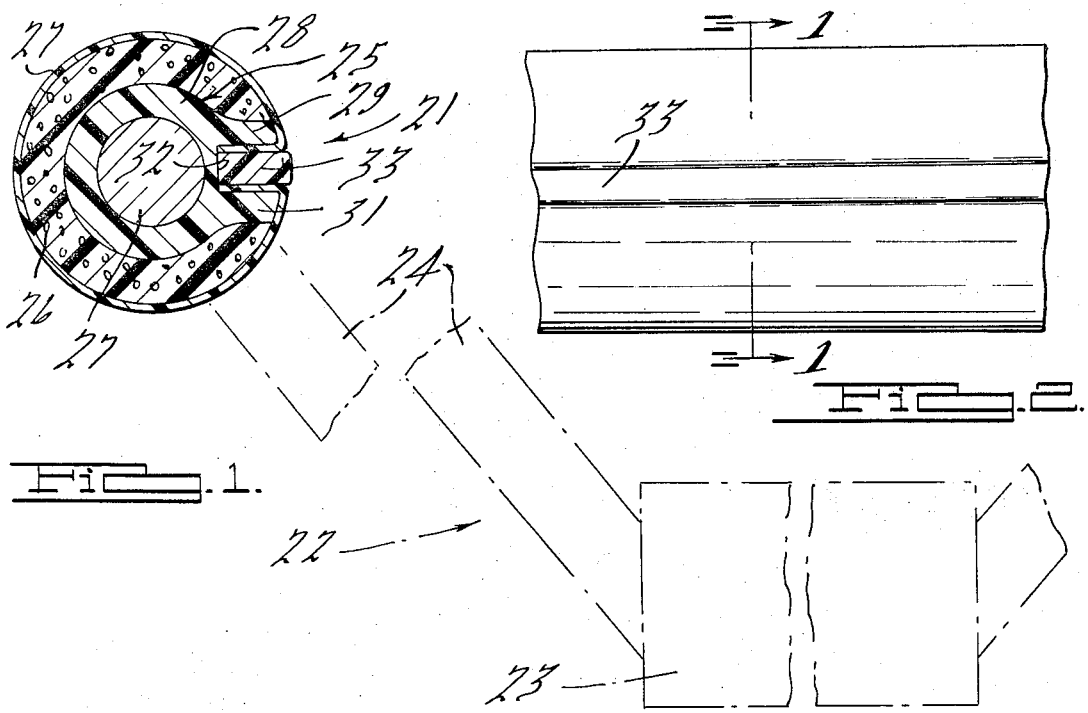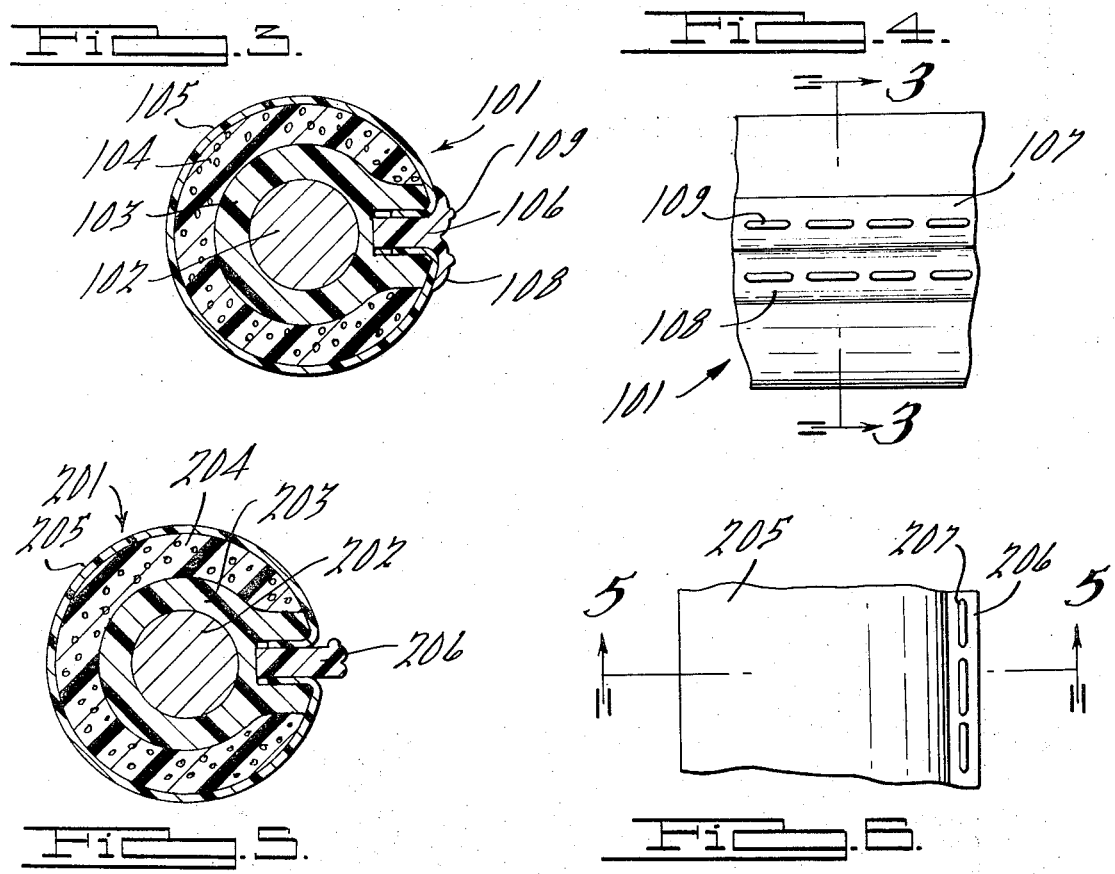

SOFT STEERING WHEEL RIM

BACKGROUND OF THE INVENTION

1. Field of the Invention

This invention relates to steering wheel rim constructions for automotive vehicles, and particularly those which are to be provided in any of various colors and have a relatively soft feel to the hand.

2. Description of the Prior Art

It is known to have vehicle steering wheel rims of 70 durometer (Shore A) or more which can be fabricated of different colors for the purpose of matching the interior appointments of the vehicle. These conventional steering wheel rims are fabricated of polyvinyl chloride (PVC). In recent years, automobile manufacturers have desired to provide steering wheel rims which are considerably softer than 70 durometer for safety purposes as well as increased sales appeal. However, it has been found that the increased plasticizer needed to manufacture PVC rims in the neighborhood of 50 durometer tends to migrate to the surface of the rim, creating an oily or sticky feel which is unsatisfactory to consumers. Another approach has been to manufacture the rim of integral skin urethane foam in the 50 durometer range. However, unless the rim is black, the color tends to disintegrate in sunlight creating unsightly patterns or blotches. To applicants' knowledge, previous attempts to provide automotive steering wheel rims in the 40 to 55 durometer range which can be provided in various colors and will be color stable, have been unsuccessful.

BRIEF SUMMARY OF THE INVENTION

It is an object of the present invention to provide a color stable automotive steering wheel rim in the 40 to 55 and preferably 45 to 55, durometer range which can be color matched to the car interior and is not oily or sticky but has a good "hand feel."

It is also an object to provide an improved steering wheel rim of this nature which is durable and soil resistant, and will not be easily nicked, scratched or abraded.

It is a further object to provide an improved steering wheel rim of this type which can be grained or textured with patterns or simulated stitching.

Briefly, the illustrated embodiments of the invention each comprise relatively rigid core means, a layer of soft substrate material of 35 durometer or under on the core, this material being selected from at least one of the class consisting of blown or expanded plastic or rubber, a plastic foam such as urethane or a very soft dense elastomer rubbery material, the core means having a shape which provides a mechanical lock relative to this substrate, and an outer covering of approximately 70 durometer or more selected from the class consisting of expanded vinyl sheet stock, dense vinyl sheet stock, vacuum formed acrylonitrile butadiene styrene and injection molded vinyl, the covering being secured to the remaining portions of the rim.

BRIEF DESCRIPTION OF THE DRAWINGS

FIG. 1 is a cross-sectional view of a first embodiment of the steering wheel rim, taken along the line 1—1 of FIG. 2.

FIG. 2 is a fragmentary side elevational view of the steering wheel rim of FIG. 1.

FIG. 3 is a cross-sectional view taken along the line 3—3 of FIG. 4 showing a second embodiment of the rim.

FIG. 4 is a fragmentary side elevational view of the second embodiment.

FIG. 5 is a cross-sectional view of a third embodiment of the invention taken along the line 5—5 of FIG. 6.

FIG. 6 is a fragmentary top elevational view of the third embodiment.

DESCRIPTION OF THE PREFERRED EMBODIMENTS

Figure 7:
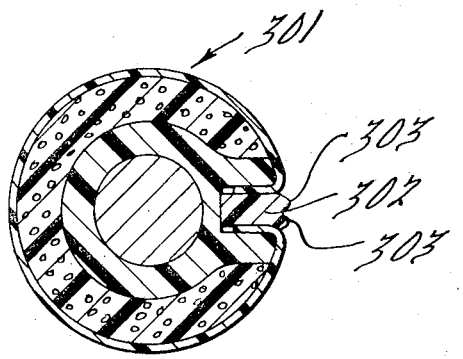
FIG. 7 is a fragmentary cross-sectional view taken along the line 7—7 of FIG. 8 and showing a fourth embodiment of the invention.

Referring first to the embodiment of FIGS. 1 and 2, the steering wheel rim is generally indicated at 21 and forms part of a steering wheel generally indicated in dot-dash lines at 22 having a hub 23 and spokes 24. Rim 21 comprises core means generally indicated at 25, a layer 26 of soft substrate material and an outer covering 27. Core means 25 comprises an inner metal core member 27 of circular cross-sectional shape and an outer core member 28. Member 28 is injection molded around inner member 27 and is fabricated of a hard plastic. It has an annular cross-sectional shape with a projection in the form of a pair of radially inwardly extending fingers 29 and 31 around its periphery for the purposes of forming a groove for the retention of the outer covering and wedge, and of mechanically locking other rim components against twisting, as will hereinafter appear.

The material of layer 26 can be a blown or expanded plastic or rubber, a plastic foam such as urethane or a very soft dense elastomer rubbery material. The hardness of this material is of 35 durometer (Shore A) or under and the layer can be either molded in place, applied as a separate component or laminated to the underside of cover 27. The shape of layer 26 will be such that it entirely surrounds member 28 except in the space between fingers 29 and 31. The abutment of layer 26 against fingers 29 and 31 will prevent relative twisting of these parts.

The material of outer covering 27 is dense or expanded vinyl sheet stock, vacuum formed acrylonitrile butadiene styrene (ABS) or injection molded vinyl. The hardness of covering 27 is approximately 70 durometer or more (Shore A). This material can be color matched to the car interior, is durable and color stable, can be grained or textured with patterns or simulated stitching, has a good "hand feel" without stickiness or oiliness, and resists soil, nicks, scratches and abrasions. The cover can be injection molded in the required shape or can be calendered stock shaped as required during assembly.

In the embodiment of FIGS. 1 and 2, covering 27 will be assembled over soft substrate 26 and secured to the rim by inserting its edges in the slot 32 between projections 29 and 31 and locking the edges in place with a wedge 33. This wedge may be any hard plastic or metal material such as an extruded hard vinyl. As an example for decorative purposes, member 33 may be a clear vinyl with aluminum foil.

After assembly, the resultant hardness of the assembled rim will be between 40 and 55 durometer (Shore A) depending upon the materials and dimensions used, and preferably between 45 and 55. Cover 27 will be color stable and the rim will have the other characteristics described above.

FIGS. 3 and 4 show a second embodiment of the invention generally indicated at 101 which is similar to the first embodiment, having an inner core member 102, an outer core member 103, a soft substrate 104 and a cover 105. In this embodiment wedge 106 is a T-shaped vinyl extrusion which holds cover 105 in place and has portions 107 and 108 which overlie the adjacent portions of cover 105 and have simulated stitching 109 formed thereon.

FIGS. 5 and 6 show a third embodiment of the invention generally indicated at 201, again having an inner core member 202, an outer core member 203, a soft substrate 204 and a cover 205. In this case, wedge 206 protrudes from its slot and has simulated stitching 207 on one side.

Figure 8:
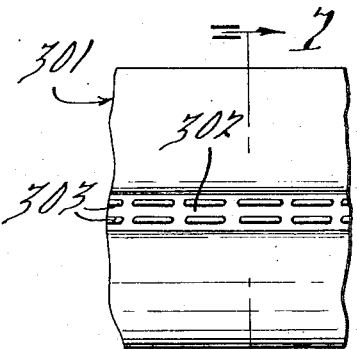
FIG. 8 is a side elevational view of the fourth embodiment.

FIGS. 7 and 8 show a fourth embodiment of the invention generally indicated at 301 which is like that of FIGS. 5 and 6 except that wedge 302 does not protrude from the rim and has simulated stitching 303 facing inwardly of the rim.

Figure 9:
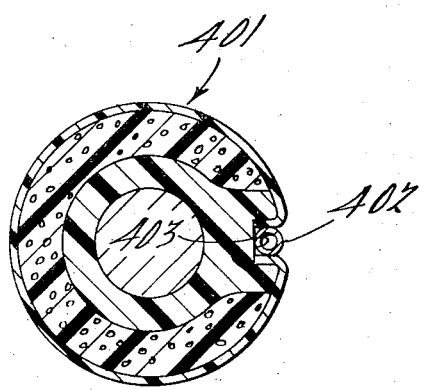
FIG. 9 is a fragmentary cross-sectional view taken along the line 9—9 of FIG. 10 and showing a fifth embodiment of the invention.
Figure 10:
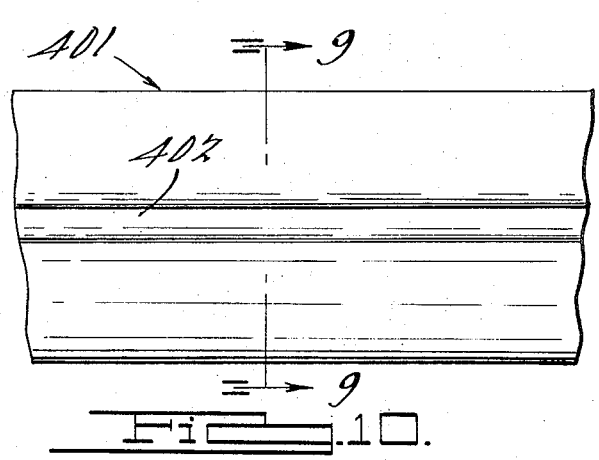
FIG. 10 is a side elevational view of the fifth embodiment.

FIGS. 9 and 10 show a fifth embodiment of the invention generally indicated at 401 in which the wedge 402 is in the form of tubular metal extrusion or the like. In this case, the groove 403 for wedge 402 is shallower than in the other embodiments.

Figure 11:
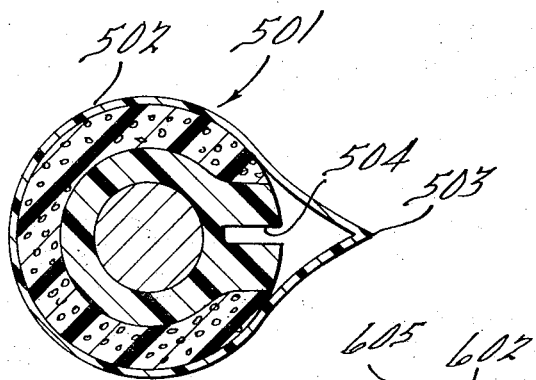
FIG. 11 is a cross-sectional view of a sixth embodiment of the invention shown before the outer covering is secured in place.
Figure 12:
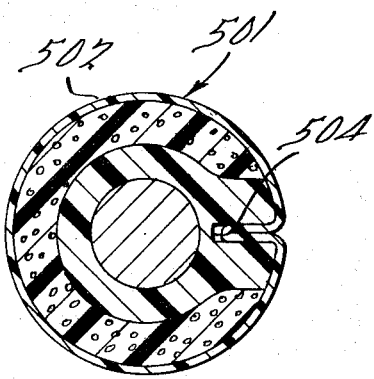
FIG. 12 is a view similar to FIG. 11 but showing the outer covering secured.

FIGS. 11 and 12 show a sixth embodiment of the invention generally indicated at 501 in which no wedge is used. Instead, cover 502 has its outer edges heat sealed together at 503 and the seal is then tucked into slot 504 as shown in FIG. 12 to retain the cover in place. This embodiment with heat sealed edges can be used in combination with any of the other embodiments with wedges.

Figure 13:
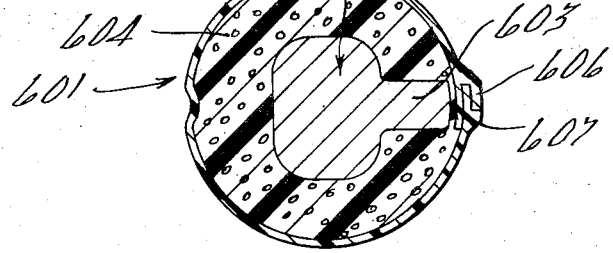
FIG. 13 is a cross-sectional view of a seventh embodiment of the invention in which the core means is an integral member.

FIG. 13 shows a seventh embodiment of the invention generally indicated at 601 which differs from the other embodiments in that the core, generally indicated at 602, does not have inner and outer core members but is integrally formed, for example of metal, with an inward projection 603. This projection serves as a mechanical lock against twisting with respect to soft substrate 604. Cover 605 has interlocking edges 606, 607 overlying projections 603. A molded simulated stitch and grain (not shown) may be formed in cover 605.

I claim:

1. A steering wheel rim having a hardness of between 40 and 55 durometer (Shore A) and capable of being manufactured of various colors with the surface being color stable, said rim comprising core means of relatively rigid material, a layer of soft substrate material surrounding said core means, said material being selected from at least one of the class consisting of a blown or expanded plastic or rubber, a plastic foam such as urethane or a very soft dense elastomer rubbery material, said layer having a hardness of 35 durometer or under, means formed on said core means and coacting with said layer to provide a mechanical lock against twisting, an outer covering surrounding said layer of soft substrate material, said outer covering being selected from at least one of the class consisting of a dense or expanded plastic sheet, vacuum formed acrylonitrile butadiene styrene or injection molded vinyl, said covering having a hardness of 70 durometer or more, and means securing said covering to said rim, and said core means comprising an inner core member of generally circular shape and an outer core member of annular cross-sectional shape surrounding said inner core member, said means for mechanically locking the soft substrate layer to said core means comprising a radial projection on said outer core member.

2. The combination according to claim 1, said projection having a slot, the edges of said outer covering being disposed within said slot.

3. The combination according to claim 2, said means for securing the outer covering to the rim comprising a wedge inserted in said slot.

4. The combination according to claim 3, said wedge having simulated stitching molded thereon.

5. The combination according to claim 2, said wedge being composed of vinyl with an aluminum foil.

6. The combination according to claim 1, said covering edges being heat sealed together, and a slot in said radial projection, whereby tucking of said edges into said slot will secure the covering to said rim.

7. The combination according to claim 1, said radial projection having a slot, the edges of said covering being inserted in said slot, said means for securing the covering to the rim comprising a tubular extrusion inserted in said groove and acting as a wedge between said edges.

8. A soft steering wheel rim having a hardness of 40 to 55 durometer (Shore A) and capable of being fabricated in various colors with a color stable surface comprising a metal inner core member having a circular cross-sectional shape, an outer core member having an annular cross-sectional shape and surrounding said inner core member, said outer core member being fabricated of a hard vinyl and having a radially inward projection comprising two fingers with a slot formed therebetween, a layer of soft substrate material surrounding said outer core member, the material of said layer being selected from at least one of the class consisting of a blown or expanded plastic or rubber, a plastic foam such as urethane or a very soft dense elastomer rubbery material, the durometer of said soft substrate layer being 35 (Shore A) or less, said layer of soft substrate material abutting said inward projection on the outer core member to provide a mechanical lock which prevents relative twisting, an outer covering surrounding said soft substrate layer, said outer covering being fabricated of a material selected from at least one of the class consisting of dense or expanded vinyl sheet stock, vacuum formed acrylonitrile butadiene styrene, and injection molded vinyl, the hardness of said outer covering being approximately 70 durometer (Shore A) or more, the edges of said covering extending into said slot, and means for mechanically locking said covering to said rim comprising a vinyl extrusion having a T-shaped cross-section inserted in the slot between said covering edges, the outer portions of said extrusion overlapping adjacent portions of said covering and having simulated stitching thereon.

* * * * *